United States Patent [19]
Jeffers

[11] Patent Number: 5,613,712
[45] Date of Patent: Mar. 25, 1997

[54] MAGNETIC FINGERPRINT FOR SECURE DOCUMENT AUTHENTICATION

[75] Inventor: Frederick J. Jeffers, Escondido, Calif.

[73] Assignee: Eastman Kodak Company, Rochester, N.Y.

[21] Appl. No.: 426,388

[22] Filed: Apr. 21, 1995

[51] Int. Cl.$^6$ .................................................. B42D 15/10
[52] U.S. Cl. ............................................ 283/78; 283/82
[58] Field of Search .................................. 283/82, 74, 78, 283/86, 69, 68; 427/1; 118/31.5; 235/380

[56] References Cited

U.S. PATENT DOCUMENTS

| | | | |
|---|---|---|---|
| 3,245,697 | 4/1966 | Nugent | 283/82 |
| 3,383,657 | 5/1968 | Claassen et al. | |
| 3,549,397 | 12/1970 | McDonald et al. | 427/1 |
| 3,601,913 | 8/1971 | Pollock | 283/82 |
| 3,831,552 | 8/1974 | Schmidt | 118/31.5 |
| 3,897,749 | 8/1975 | May et al. | 118/31.5 |
| 3,899,995 | 8/1975 | Robinson | 118/31.5 |
| 4,182,261 | 1/1980 | Smith, III et al. | 118/31.2 |
| 4,253,017 | 2/1981 | Whitehead | 283/82 X |
| 4,379,178 | 4/1983 | Meadows et al. | 427/1 |
| 4,455,083 | 6/1984 | Elmes | |
| 4,532,508 | 7/1985 | Ruell | |
| 4,553,837 | 11/1985 | Marcus | 356/71 |
| 4,699,077 | 10/1987 | Meadows et al. | 118/31.5 |
| 4,882,195 | 11/1989 | Butland | 427/1 |
| 4,977,040 | 12/1990 | Yano et al. | 283/82 X |
| 5,078,426 | 1/1992 | Reardon | 283/78 |
| 5,190,318 | 3/1993 | Mantegazza | 283/58 X |
| 5,310,222 | 5/1994 | Chatwin et al. | 283/86 |
| 5,473,144 | 12/1995 | Mathurin, Jr. | 235/380 |
| 5,480,685 | 1/1996 | Suzuki et al. | 283/82 X |

FOREIGN PATENT DOCUMENTS 0310707  4/1989  European Pat. Off. ................. 283/82

Primary Examiner—Frances Han
Attorney, Agent, or Firm—William F. Noval

[57] ABSTRACT

A magnetic fingerprint image is implemented by having the user coat his finger tip with a magnetic powder and transferring the powder particles to the document surface. The magnetic fingerprint image is then covered by a thin, non-removable, plastic film that is optically opaque but is magnetically transparent. The print is scannable by a magnetic head whose output signal consists of a sequence of electrical waveforms characteristic of the ridges and depressions that define the fingerprint. The fingerprint image may be angularly rotated about an axis perpendicular to the plane of the print prior to fixing the fingerprint image onto the document. Because the image is covered by the opaque film, the outside observer cannot determine the angular orientation of the image relative to the document edge. A magnetically encoded "address" readable by the scanning magnetic head before it reads the magnetic fingerprint itself, informs the scanning apparatus of the fingerprint angular orientation. By means of this information, the magnetic head is rotated through the proper angle so that it is correctly oriented relative to the image before scanning the image, or an angularly fixed magnetic head may scan the rotated image to obtain "scrambled" fingerprint data. This data is converted to digital values, the digital values are stored, and then a computation, taking into consideration the angular position of the read fingerprint image, is performed transforming the "scrambled" values back into to their normal values for comparison with the data derived from the user's actual fingerprint.

5 Claims, 1 Drawing Sheet

MAGNETIC FINGERPRINT FOR SECURE DOCUMENT AUTHENTICATION

BACKGROUND OF THE INVENTION

1. Field of the Invention

This invention relates to a method and an article of manufacture to enhance document security, and in particular to provide an authenticating link between a document and the person offering the document for use.

2. Description Relative to the Prior Art

The proliferation of credit card and other paper based transactions in retail and commercial dealings has resulted in a rise in accompanying fraudulent losses to consumers, banks, and businesses. Many remedial countermeasures to the counterfeiting and fraudulent use of credit cards and other personally identifiable documents have been disclosed. For convenience of discussion, the problem is herein considered in terms of credit card usage, although the considerations are readily broadened to determination of user authorization for other personally identifiable documents. In terms of credit card use, those countermeasures wherein there is no confirmation at the point of sale that the offeror of the credit card is, in fact, the authorized user of the card have been readily compromised by the counterfeiting of the card itself. Such counterfeiting is within the capabilities of at least some modern, sophisticated criminals.

A more secure method ties the user at the point of sale to the card by incorporating into the card some unique non-forgeable feature of the person to whom the card is issued. A person's fingerprint is one such unique feature, and systems in which the incorporation of an optical image of the fingerprint replicated on the card has been disclosed include Classen et al (U.S. Pat. No. 3,383,657), Elmes (U.S. Pat. No. 4,455,083), and Ruell (U.S. Pat. No. 4,532,508). In presenting the card for use, the user also places his finger in an authenticating apparatus containing a scanner which scans his actual fingerprint while a card reader in the apparatus scans the optical image of the fingerprint replicated on the card. The authenticating apparatus compares the data derived from the two scans, and if they match the card offeror may be approved as the authorized user of the card.

As the image of the fingerprint is to be optically scanned by the reader, the print on the card must be clearly visible. With continued use, the print may become obscured by dirt or scratches, causing errors in the scanned data which defeat system reliability. Also, the visibility of the print mitigates against the security of the card in that a potential counterfeiter gains the advantage of readily determining the form and substance of the key element in the system. This information may be of substantial help to him in an attempt to compromise the security system by counterfeiting the card and fingerprint.

SUMMARY OF THE INVENTION

Rather than placing an optical image of a fingerprint on the user's card, the present invention teaches placing a magnetic image of the fingerprint on the card. The magnetic image is implemented during card fabrication by having the user coat his finger tip pad with a magnetic powder and then transferring the powder particles in duplication of his fingerprint to the card surface in the same way as obtaining a fingerprint by means of an inked pad. The magnetic fingerprint image is then covered by a thin, non-removable, plastic film that is optically opaque but is magnetically transparent. This protects the fingerprint image while it permits it to be scanned and reproduced by a narrow track magnetic head. Prior to scanning by the magnetic head, the magnetic fingerprint is magnetized by passing a fixed magnet over the fingerprint. The scanned magnetic head output signal consists of a sequence of electrical waveforms characteristic of the ridges and depressions that uniquely define the fingerprint.

The opaque thin film covering the magnetic fingerprint image provides several useful features. It physically protects the fingerprint image, and it denies visual access to the structure of the identifying fingerprint to potential fraud perpetrators. Additionally, the practice of the invention teaches rotating the fingerprint image about an axis perpendicular to the plane of the print to one of several pre-selected angular positions prior to fixing the fingerprint image onto the card. Because the image is covered by the opaque film, the outside observer cannot determine the angular orientation of the image relative to the card edge. A magnetically encoded "address" readable by the scanning magnetic head before it reads the magnetic fingerprint itself, informs the scanning apparatus of the fingerprint angular orientation. By means of this information, the magnetic head may be rotated through the proper angle so that it is correctly oriented relative to the image before scanning the image, or a fixed magnetic head may scan the rotated image to obtain "scrambled" fingerprint data. The data is converted to digital values, the digital values are stored, and then a computation, taking into consideration the angular position of the read fingerprint image, is performed transforming the "scrambled" values back into to their normal values for comparison with the data derived from the optical scanning of the user's actual fingerprint.

BRIEF DESCRIPTION OF THE DRAWINGS

The invention will be described in relation to the drawings of which.

DESCRIPTION OF THE PREFERRED EMBODIMENTS

Figure 1:
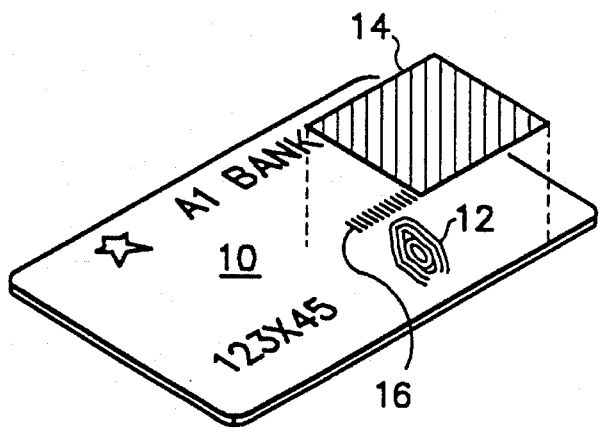
FIG. 1 is a drawing of a document having a magnetic fingerprint incorporated therein.

Referring to FIG. 1, a magnetic fingerprint 12 of the person authorized to use a document 10 is integrally imprinted on the document 10. The magnetic fingerprint 12 is implemented by the authorized person coating his finger tip pad with a magnetic powder. The magnetic image 12 of the fingerprint is transferred by pressing the coated finger against the document so that the ridges and depressions of the fingerprint are magnetically replicated on the document 10. Suitable magnetic powders include those of high coercivity materials such as $Fe_2O_3$, BaFe, $SmCO_5$, and those of low coercivity materials such as $Fe_3O_4$, and Fe powder. A line of encoded information 16 is magnetically recorded on the document 10 above the magnetic fingerprint 12 to serve a purpose to be described below. An optically opaque but magnetically transparent thin film 14 is permanently secured to the surface of the document 10, covering the magnetic fingerprint 12 and the encoded information 16.

Figure 2:
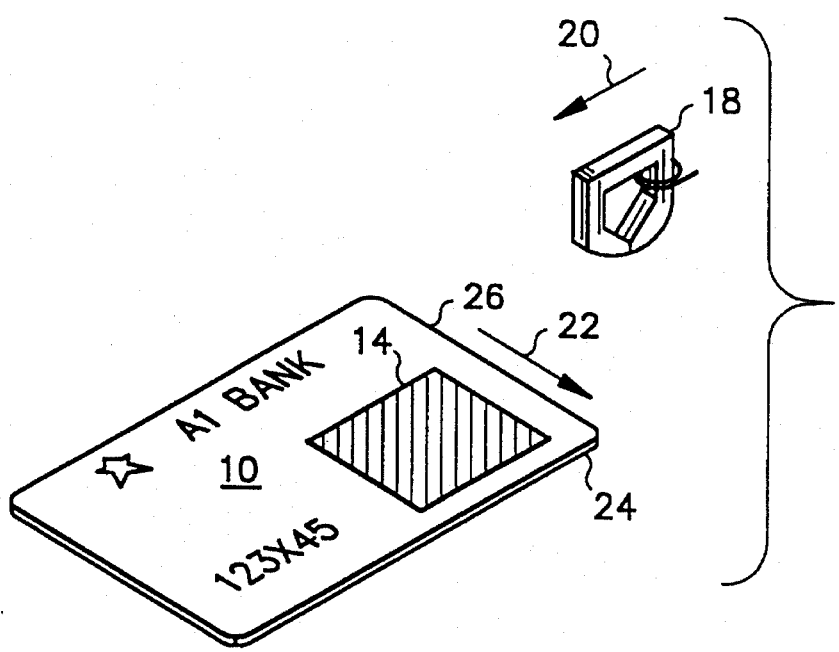
FIG. 2 is a drawing of the document of FIG. 1 wherein the fingerprint is covered by an optically opaque cover.

Referring to FIG. 2, the thin film 14 protects the magnetic fingerprint 12 from scratches and dirt, and adds security to the document 10 by preventing visual access to the characteristics of the fingerprint 12. Through the thin film 14, a magnetic head 18, scans the encoded information 16 and then scans across the magnetic fingerprint 12 in the direction 20. After a line scan in the direction 20, the head 18 is incrementally stepped in the direction 22 and the next line across the magnetic fingerprint 12 is scanned in the direction 20. The signal output of the magnetic head 18 is a sequence of electrical signals corresponding to the ridges and depressions of the magnetic fingerprint 12. These signals may be compared with the results of optically scanning the finger of the offeror of the document to determine if the offeror is, in fact, the authorized user whose magnetic fingerprint 12 is imprinted on the document 10.

Figure 3:
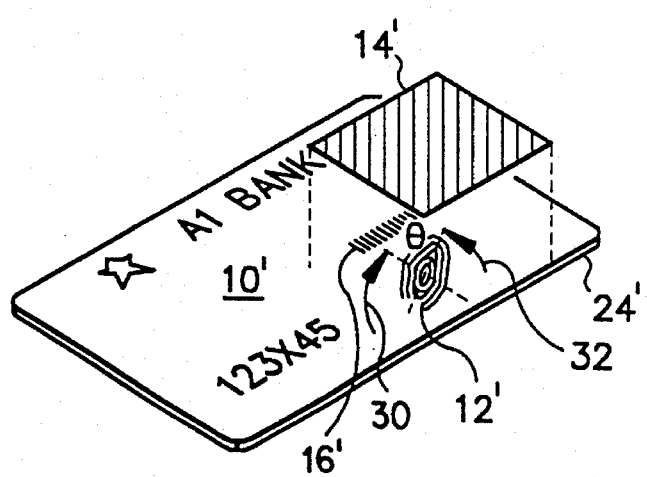
FIG. 3 is a drawing of the document of FIG. 1 wherein the fingerprint is rotated in the plane of the document.

The use of the encoded information 16 may be understood by referring to FIG. 3. First, it is to be noted that the direction 20 is parallel to an edge 24 of the document 10, and that the direction 22 is parallel to an edge 26. (FIG. 2) The line of encoded information 16 is recorded, say, parallel to the edge 24, i.e. the direction in which the head 18 scans the fingerprint 12. The fingerprint axis 32 is defined as the direction of a fingerprint along the length of the related finger. As shown in FIG. 3, a fingerprint 12' may be imprinted with its fingerprint axis 32 rotated through an angle θ with respect to an axis 30 parallel to the edge 26. (In the drawings, different but related elements are identified by the same reference character, albeit that the different elements are distinguished by primes.) The magnitude of rotation θ relative to the axis 30 is carried in the encoded information 16. (It is to be further noted that the fingerprint 12 of FIG. 1 is substantially imprinted at the angle θ=0.) When the magnetic head 18 scans the card 10', it first reads the encoded data 16' which establishes the value of θ. The head may now be rotated through the same angle θ, and scanned across the fingerprint 12' in the direction perpendicular to the axis 32, and incrementally stepped in the direction parallel to the axis 32. Under these conditions, the head output is the same as it would be when scanning in the directions 20, 22 (FIG. 2) of a fingerprint having θ=0. Alternately, the magnetic head 18 need not be rotated, but may scan the fingerprint 12 along the directions 20, 22. The data from the magnetic head 18, may now be digitized and stored, and a mathematical computation performed that transforms the rotated digital values into the equivalent "unrotated" values.

The invention has been described in detail with particular reference to preferred embodiments thereof, but it will be understood that variations and modifications can be effected within the spirit and scope of the invention. For example, the invention has been described with respect to financial transactions using credit cards and similar financial documents, but it will be appreciated that the teaching of the invention may be applied to other identification problems, such as admission of authorized personnel into restricted areas.

What is claimed is:

1. A personal identification document comprising:
   a) a medium comprising said document,
   b) means for obtaining a magnetic image of a personal fingerprint, said magnetic image having a fingerprint axis along the direction of the finger related to said magnetic image,
   c) means for rotating the fingerprint axis of said magnetic image by an angle relative to a fixed direction in said medium, wherein a rotated magnetic image relative to said fixed direction is obtained,
   d) means for incorporating said rotated magnetic image on said medium,
   e) means for incorporating magnetically recorded information on said medium, said recorded information specifying the magnitude of said angle, and
   f) means for covering said magnetic image and said magnetically recorded information, wherein said means for covering is optically opaque and magnetically transparent.

2. The document of claim 1 wherein said means for covering said magnetic image and said recorded information is a plastic film.

3. The document of claim 1 wherein said magnetic image is comprised of a high coercivity magnetic material including $Fe_2O_3$, BaFe, or $SmCO_5$.

4. The document of claim 1 wherein said magnetic image is comprised of a low coercivity material including $Fe_3O_4$, or Fe powder.

5. The document of claim 1 wherein said document is a credit card.

* * * * *